United States Patent
Kasturi et al.

(10) Patent No.: US 9,673,872 B2
(45) Date of Patent: Jun. 6, 2017

(54) MULTI-BAND TRANSMIT ANTENNA

(75) Inventors: Sreenivas Kasturi, San Diego, CA (US); Zhen Ning Low, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 847 days.

(21) Appl. No.: 13/549,314

(22) Filed: Jul. 13, 2012

(65) Prior Publication Data

US 2013/0119924 A1     May 16, 2013

Related U.S. Application Data

(60) Provisional application No. 61/560,176, filed on Nov. 15, 2011.

(51) Int. Cl.
| | |
|---|---|
| H01F 27/42 | (2006.01) |
| H01F 37/00 | (2006.01) |
| H01F 38/00 | (2006.01) |
| H04B 5/00 | (2006.01) |

(52) U.S. Cl.
CPC ......... *H04B 5/0087* (2013.01); *H04B 5/0037* (2013.01)

(58) Field of Classification Search
CPC .......... H02J 17/00; H02J 17/005; H02J 7/025; H02J 50/00; H02J 5/005; H01F 38/14
USPC ....................................................... 307/104
See application file for complete search history.

(56) References Cited

U.S. PATENT DOCUMENTS

| | | |
|---|---|---|
| 8,934,857 B2 | 1/2015 | Low et al. |
| 2007/0021140 A1 | 1/2007 | Keys, IV et al. |
| 2008/0227478 A1 | 9/2008 | Greene et al. |
| 2009/0134712 A1* | 5/2009 | Cook ....................... H02J 5/005 307/104 |
| 2009/0322285 A1 | 12/2009 | Hautanen |
| 2010/0038970 A1* | 2/2010 | Cook et al. ................... 307/104 |
| 2010/0068996 A1 | 3/2010 | Haartsen |

(Continued)

FOREIGN PATENT DOCUMENTS

| | | |
|---|---|---|
| CN | 1059621 A | 3/1992 |
| CN | 2569356 Y | 8/2003 |

(Continued)

OTHER PUBLICATIONS

International Search Report and Written Opinion—PCT/US2012/064850—ISA/EPO—Feb. 6, 2013.

*Primary Examiner* — Rexford Barnie
*Assistant Examiner* — Rasem Mourad
(74) *Attorney, Agent, or Firm* — Knobbe, Martens, Olson & Bear, LLP

(57) ABSTRACT

This disclosure provides systems, methods and apparatus for tuning a transmit antenna for operation in a plurality of frequency bands. In one aspect, a transmitting antenna system is provided. The transmitting antenna system includes an active transmit antenna and a tunable passive antenna. The active antenna is configured to transmit a field over a plurality of operating frequencies. The passive antenna is configured to transmit a field over at least two frequencies of the plurality of operating frequencies. In one aspect, the tunable passive antenna includes a network of a plurality of reactive elements. In another aspect, the plurality of operating frequencies is selected from a set including a charging frequency, an NFC frequency, and a communication frequency.

19 Claims, 9 Drawing Sheets

(56) References Cited

U.S. PATENT DOCUMENTS

| | | | |
|---|---|---|---|
| 2010/0164296 A1* | 7/2010 | Kurs et al. | 307/104 |
| 2011/0101788 A1* | 5/2011 | Sun et al. | 307/104 |
| 2011/0115303 A1* | 5/2011 | Baarman | H02J 17/00 |
| | | | 307/104 |
| 2011/0169338 A1 | 7/2011 | Kozakai | |
| 2011/0181120 A1 | 7/2011 | Liu et al. | |
| 2012/0326842 A1* | 12/2012 | Grinberg | G06K 7/10178 |
| | | | 340/10.1 |

FOREIGN PATENT DOCUMENTS

| | | |
|---|---|---|
| CN | 101442847 A | 5/2009 |
| CN | 101807745 A | 8/2010 |
| CN | 102082449 A | 6/2011 |
| JP | 2005086419 A | 3/2005 |
| JP | 2011062008 A | 3/2011 |
| WO | 2008112977 A1 | 9/2008 |
| WO | WO-2010093723 A1 | 8/2010 |
| WO | WO-2011083594 A1 | 7/2011 |
| WO | WO-2011143547 A1 | 11/2011 |

* cited by examiner

MULTI-BAND TRANSMIT ANTENNA

CROSS-REFERENCE TO RELATED APPLICATIONS

This application claims priority under 35 U.S.C. §119(e) to U.S. Provisional App. No. 61/560,176, filed Nov. 15, 2011, which is incorporated by reference herein in its entirety.

FIELD

The present invention relates generally to wireless power. More specifically, the disclosure is directed to power transmit antennas configured to operate in multiple frequency bands.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power. As such, these devices constantly require recharging. Rechargeable devices are often charged via wired connections through cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices or provide power to electronic devices may overcome some of the deficiencies of wired charging solutions. As such, wireless power transfer systems and methods that efficiently and safely transfer power to electronic devices are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides an apparatus for wireless charging. The apparatus can include a transmitting antenna. The transmitting antenna can include an active antenna configured to transmit a field over a plurality of operating frequencies. The transmitting antenna can further include a passive antenna configured to transmit a field over at least two frequencies of the plurality of operating frequencies.

Another aspect of the disclosure provides a method of charging a wireless device. The method include transmitting, at an active antenna, a field at a first operating frequency. The method further includes transmitting, at a passive antenna, a field at the first operating frequency. The method further includes transmitting, at the passive antenna, a field at a second operating frequency. The passive antenna has a first reactance at the first frequency and a second reactance at the second frequency.

Another aspect of the disclosure provides an apparatus for charging a wireless device. The apparatus includes means for actively transmitting a field at a first operating frequency. The apparatus further includes means for passively transmitting a field at the first operating frequency and at a second operating frequency. The means for passively transmitting includes means for providing a first reactance at the first frequency and a second reactance at the second frequency.

Another aspect of the disclosure provides a non-transitory, computer-readable medium. The medium includes code that, when executed, causes an apparatus to transmit, at an active antenna, a field at a first operating frequency. The medium further includes code that, when executed, causes the apparatus to transmit, at a passive antenna, a field at the first operating frequency. The medium further includes code that, when executed, causes the apparatus to transmit, at the passive antenna, a field at a second operating frequency. The passive antenna has a first reactance at the first frequency and a second reactance at the second frequency.

Figure 1:
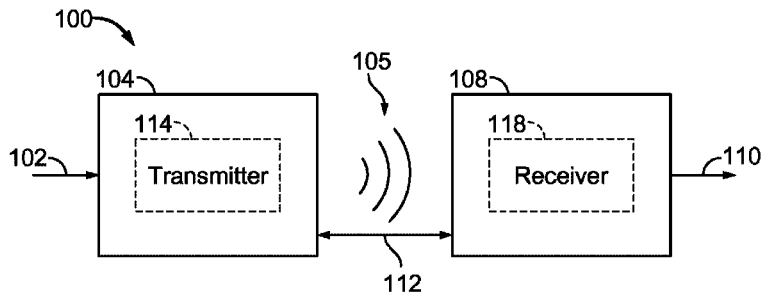
FIG. 1 is a functional block diagram of an exemplary wireless power transfer system, in accordance with exemplary embodiments.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments. The exemplary embodiments may be practiced without these specific details. In some instances, well-known structures and devices are shown in block diagram form in order to avoid obscuring the novelty of the exemplary embodiments presented herein.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving antenna" to achieve power transfer.

FIG. 1 is a functional block diagram of an exemplary wireless power transfer system 100, in accordance with exemplary embodiments. Input power 102 may be provided to a transmitter 104 from a power source (not shown) for generating a field 105 for providing energy transfer. A receiver 108 may couple to the field 105 and generate output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship. When the resonant frequency of receiver 108 and the resonant frequency of transmitter 104 are substantially the same or very close, transmission losses between the transmitter 104 and the receiver 108 are minimal. As such, wireless power transfer may be provided over larger distance in contrast to purely inductive solutions that may require large antennas that require antennas to be very close (e.g., mms). Resonant inductive coupling techniques may thus allow for improved efficiency and power transfer over various distances and with a variety of inductive antenna configurations.

The receiver 108 may receive power when the receiver 108 is located in an energy field 105 produced by the transmitter 104. The field 105 corresponds to a region where energy output by the transmitter 104 may be captured by a receiver 105. In some cases, the field 105 may correspond to the "near-field" of the transmitter 104 as will be further described below. The transmitter 104 may include a transmit antenna 114 for outputting an energy transmission. The receiver 108 further includes a receive antenna 118 for receiving or capturing energy from the energy transmission. The near-field may correspond to a region in which there are strong reactive fields resulting from the currents and charges in the transmit antenna 114 that minimally radiate power away from the transmit antenna 114. In some cases the near-field may correspond to a region that is within about one wavelength (or a fraction thereof) of the transmit antenna 114. The transmit and receive antennas 114 and 118 are sized according to applications and devices to be associated therewith. As described above, efficient energy transfer may occur by coupling a large portion of the energy in a field 105 of the transmit antenna 114 to a receive antenna 118 rather than propagating most of the energy in an electromagnetic wave to the far field. When positioned within the field 105, a "coupling mode" may be developed between the transmit antenna 114 and the receive antenna 118. The area around the transmit and receive antennas 114 and 118 where this coupling may occur is referred to herein as a coupling-mode region.

Figure 2:
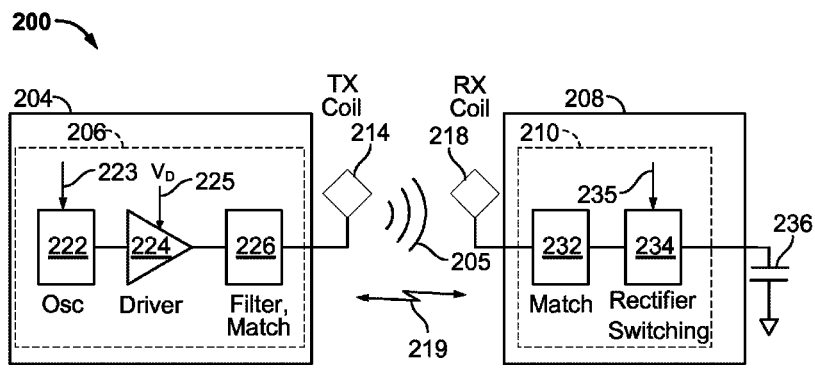
FIG. 2 is a functional block diagram of exemplary components that may be used in the wireless power transfer system of FIG. 1, in accordance with various exemplary embodiments.

FIG. 2 is a functional block diagram of exemplary components that may be used in the wireless power transfer system 100 of FIG. 1, in accordance with various exemplary embodiments. The transmitter 204 may include transmit circuitry 206 that may include an oscillator 222, a driver circuit 224, and a filter and matching circuit 226. The oscillator 222 may be configured to generate a signal at a desired frequency, such as 468.75 KHz, 6.78 MHz or 13.56 MHz, that may be adjusted in response to a frequency control signal 223. The oscillator signal may be provided to a driver circuit 224 configured to drive the transmit antenna 214 at, for example, a resonant frequency of the transmit antenna 214. The driver circuit 224 may be a switching amplifier configured to receive a square wave from the oscillator 222 and output a sine wave. For example, the driver circuit 224 may be a class E amplifier. A filter and matching circuit 226 may be also included to filter out harmonics or other unwanted frequencies and match the impedance of the transmitter 204 to the transmit antenna 214.

The receiver 208 may include receive circuitry 210 that may include a matching circuit 232 and a rectifier and switching circuit 234 to generate a DC power output from an AC power input to charge a battery 236 as shown in FIG. 2 or to power a device (not shown) coupled to the receiver 108. The matching circuit 232 may be included to match the impedance of the receive circuitry 210 to the receive antenna 218. The receiver 208 and transmitter 204 may additionally communicate on a separate communication channel 219 (e.g., Bluetooth, zigbee, cellular, etc). The receiver 208 and transmitter 204 may alternatively communicate via in-band signaling using characteristics of the wireless field 206.

As described more fully below, receiver 208, that may initially have a selectively disable associated load (e.g., battery 236), may be configured to determine whether an amount of power transmitted by transmitter 204 and received by receiver 208 is appropriate for charging a battery 236. Further, receiver 208 may be configured to enable a load (e.g., battery 236) upon determining that the amount of power is appropriate. In some embodiments, a receiver 208 may be configured to directly utilize power received from a wireless power transfer field without charging of a battery 236. For example, a communication device, such as a near-field communication (NFC) or radio-frequency identification device (RFID may be configured to receive power from a wireless power transfer field and communicate by interacting with the wireless power transfer field and/or utilize the received power to communicate with a transmitter 204 or other devices.

Figure 3:
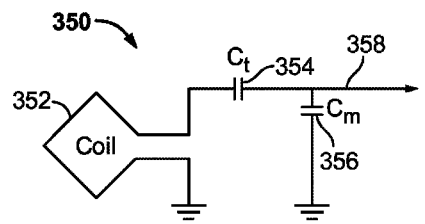
FIG. 3 is a schematic diagram of a portion of transmit circuitry or receive circuitry of FIG. 2 including a transmit or receive antenna, in accordance with exemplary embodiments.

FIG. 3 is a schematic diagram of a portion of transmit circuitry 206 or receive circuitry 210 of FIG. 2 including a transmit or receive antenna 352, in accordance with exemplary embodiments. As illustrated in FIG. 3, transmit or receive circuitry 350 used in exemplary embodiments may include an antenna 352. The antenna may also be referred to or be configured as a "loop" antenna 352. The antenna 352 may also be referred to herein or be configured as a "magnetic" antenna, an induction antenna. In an aspect, the antenna 352 can be a coil antenna. The term "antenna" is intended to refer to a component that may wirelessly output or receive energy for coupling to another "antenna." The antenna 352 may be configured to include an air core or a physical core such as a ferrite core (not shown). Air core loop antennas may be more tolerable to extraneous physical devices placed in the vicinity of the core. Furthermore, an air core loop antenna 352 allows the placement of other components within the core area. In addition, an air core loop may more readily enable placement of the receive antenna 218 (FIG. 2) within a plane of the transmit antenna 214 (FIG. 2) where the coupled-mode region of the transmit antenna 214 (FIG. 2) may be more powerful.

As stated, efficient transfer of energy between the transmitter 104 and receiver 108 may occur during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the field 105 of the transmitting antenna to the receiving antenna residing in the neighborhood where this field 105 is established rather than propagating the energy from the transmitting antenna into free space.

The resonant frequency of the loop or magnetic antennas is based on the inductance and capacitance. Inductance may be simply the inductance created by the antenna 352, whereas, capacitance may be added to the antenna's inductance to create a resonant structure at a desired resonant frequency. As a non-limiting example, capacitor 352 and capacitor 354 may be added to the transmit or receive circuitry 350 to create a resonant circuit that selects a signal 356 at a resonant frequency. Accordingly, for larger diameter antennas, the size of capacitance needed to sustain resonance may decrease as the diameter or inductance of the loop increases. Furthermore, as the diameter of the antenna increases, the efficient energy transfer area of the near-field may increase. Other resonant circuits formed using other components are also possible. As another non-limiting example, a capacitor may be placed in parallel between the two terminals of the antenna 350. For transmit antennas, a signal 358 with a frequency that substantially corresponds to the resonant frequency of the antenna 352 may be an input to the antenna 352.

In one embodiment, the transmitter 104 may be configured to output a time varying magnetic field with a frequency corresponding to the resonant frequency of the transmit antenna 114. When the receiver is within the field 105, the time varying magnetic field may induce a current in the receive antenna 118. As described above, if the receive antenna 118 is configured to be resonant at the frequency of the transmit antenna 118, energy may be efficiently transferred. The AC signal induced in the receive antenna 118 may be rectified as described above to produce a DC signal that may be provided to charge or to power a load.

Figure 4:
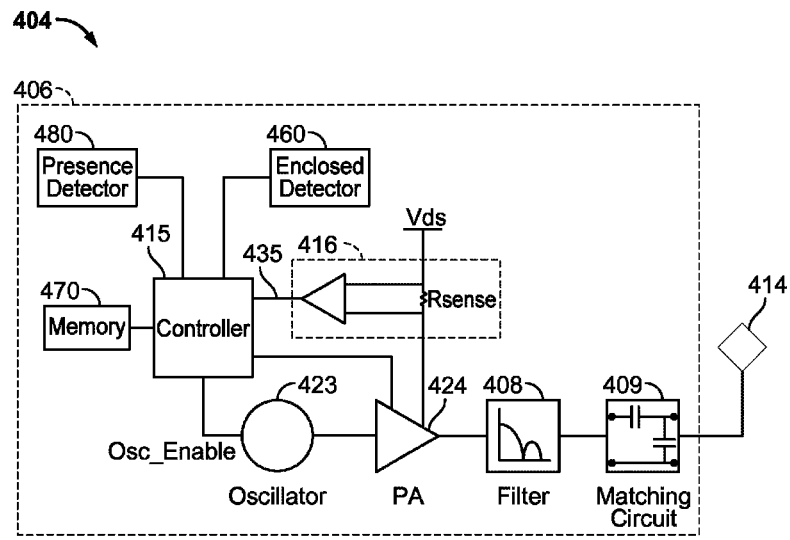
FIG. 4 is a functional block diagram of a transmitter that may be used in the wireless power transfer system of FIG. 1, in accordance with exemplary embodiments

FIG. 4 is a functional block diagram of a transmitter 404 that may be used in the wireless power transfer system of FIG. 1, in accordance with exemplary embodiments. The transmitter 404 may include transmit circuitry 406 and a transmit antenna 414. The transmit antenna 414 may be the antenna 352 as shown in FIG. 3. Transmit circuitry 406 may provide RF power to the transmit antenna 414 by providing an oscillating signal resulting in generation of energy (e.g., magnetic flux) about the transmit antenna 414. Transmitter 404 may operate at any suitable frequency. By way of example, transmitter 404 may operate at the 13.56 MHz ISM band.

Transmit circuitry 406 may include a fixed impedance matching circuit 409 for matching the impedance of the transmit circuitry 406 (e.g., 50 ohms) to the transmit antenna 414 and a low pass filter (LPF) 408 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that may be varied based on measurable transmit metrics, such as output power to the antenna 414 or DC current drawn by the driver circuit 424. Transmit circuitry 406 further includes a driver circuit 424 configured to drive an RF signal as determined by an oscillator 423. The transmit circuitry 406 may be comprised of discrete devices or circuits, or alternately, may be comprised of an integrated assembly. An exemplary RF power output from transmit antenna 414 may be on the order of 2.5 Watts.

Transmit circuitry 406 may further include a controller 415 for selectively enabling the oscillator 423 during transmit phases (or duty cycles) for specific receivers, for adjusting the frequency or phase of the oscillator 423, and for adjusting the output power level for implementing a communication protocol for interacting with neighboring devices through their attached receivers. It is noted that the controller 415 may also be referred to herein as processor 415. Adjustment of oscillator phase and related circuitry in the transmission path may allow for reduction of out of band emissions, especially when transitioning from one frequency to another.

The transmit circuitry 406 may further include a load sensing circuit 416 for detecting the presence or absence of active receivers in the vicinity of the near-field generated by transmit antenna 414. By way of example, a load sensing circuit 416 monitors the current flowing to the driver circuit 424, that may be affected by the presence or absence of active receivers in the vicinity of the field generated by transmit antenna 414 as will be further described below. Detection of changes to the loading on the driver circuit 424 are monitored by controller 415 for use in determining whether to enable the oscillator 423 for transmitting energy and to communicate with an active receiver. As described more fully below, a current measured at the driver circuit 424 may be used to determine whether an invalid device is positioned within a wireless power transfer region of the transmitter 404.

The transmit antenna 414 may be implemented with a Litz wire or as an antenna strip with the thickness, width and metal type selected to keep resistive losses low. In a one implementation, the transmit antenna 414 may generally be configured for association with a larger structure such as a table, mat, lamp or other less portable configuration. Accordingly, the transmit antenna 414 generally may not need "turns" in order to be of a practical dimension. An exemplary implementation of a transmit antenna 414 may be "electrically small" (i.e., fraction of the wavelength) and tuned to resonate at lower usable frequencies by using capacitors to define the resonant frequency.

The transmitter 404 may gather and track information about the whereabouts and status of receiver devices that may be associated with the transmitter 404. Thus, the transmit circuitry 406 may include a presence detector 480, an enclosed detector 460, or a combination thereof, connected to the controller 415 (also referred to as a processor herein). The controller 415 may adjust an amount of power delivered by the driver circuit 424 in response to presence signals from the presence detector 480 and the enclosed detector 460. The transmitter 404 may receive power through a number of power sources, such as, for example, an AC-DC converter (not shown) to convert conventional AC power present in a building, a DC-DC converter (not shown) to convert a conventional DC power source to a voltage suitable for the transmitter 404, or directly from a conventional DC power source (not shown).

As a non-limiting example, the presence detector 480 may be a motion detector utilized to sense the initial presence of a device to be charged that is inserted into the coverage area of the transmitter 404. After detection, the transmitter 404 may be turned on and the RF power received by the device may be used to toggle a switch on the Rx device in a pre-determined manner, which in turn results in changes to the driving point impedance of the transmitter 404.

As another non-limiting example, the presence detector 480 may be a detector capable of detecting a human, for example, by infrared detection, motion detection, or other suitable means. In some exemplary embodiments, there may be regulations limiting the amount of power that a transmit antenna 414 may transmit at a specific frequency. In some cases, these regulations are meant to protect humans from electromagnetic radiation. However, there may be environments where a transmit antenna 414 is placed in areas not occupied by humans, or occupied infrequently by humans, such as, for example, garages, factory floors, shops, and the like. If these environments are free from humans, it may be permissible to increase the power output of the transmit antenna 414 above the normal power restrictions regulations. In other words, the controller 415 may adjust the power output of the transmit antenna 414 to a regulatory level or lower in response to human presence and adjust the power output of the transmit antenna 414 to a level above the regulatory level when a human is outside a regulatory distance from the electromagnetic field of the transmit antenna 414.

As a non-limiting example, the enclosed detector 460 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 404 does not remain on indefinitely may be used. In this case, the transmitter 404 may be programmed to shut off after a user-determined amount of time. This feature prevents the transmitter 404, notably the driver circuit 424, from running long after the wireless devices in its perimeter are fully charged. This event may be due to the failure of the circuit to detect the signal sent from either the repeater or the receive antenna that a device is fully charged. To prevent the transmitter 404 from automatically shutting down if another device is placed in its perimeter, the transmitter 404 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
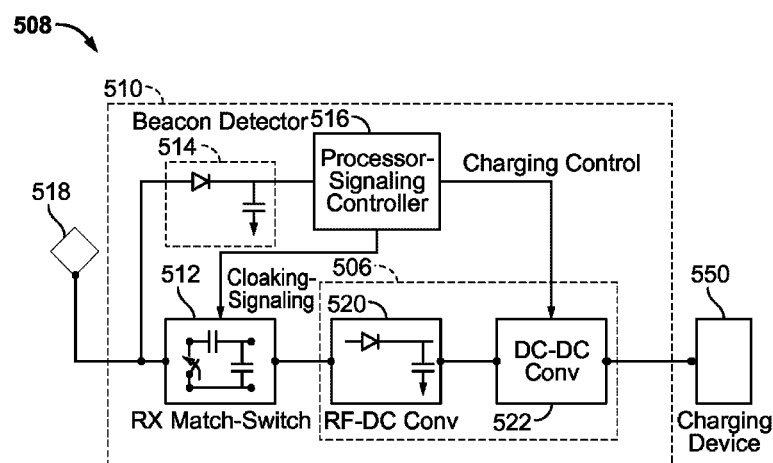
FIG. 5 is a functional block diagram of a receiver that may be used in the wireless power transfer system of FIG. 1, in accordance with exemplary embodiments.

FIG. 5 is a functional block diagram of a receiver 508 that may be used in the wireless power transfer system of FIG. 1, in accordance with exemplary embodiments. The receiver 508 includes receive circuitry 510 that may include a receive antenna 518. Receiver 508 further couples to device 550 for providing received power thereto. It should be noted that receiver 508 is illustrated as being external to device 550 but may be integrated into device 550. Energy may be propagated wirelessly to receive antenna 518 and then coupled through the rest of the receive circuitry 510 to device 550. By way of example, the charging device may include devices such as mobile phones, portable music players, laptop computers, tablet computers, computer peripheral devices, communication devices (e.g., Bluetooth devices), digital cameras, hearing aids (an other medical devices), and the like.

Receive antenna 518 may be tuned to resonate at the same frequency, or within a specified range of frequencies, as transmit antenna 414 (FIG. 4). Receive antenna 518 may be similarly dimensioned with transmit antenna 414 or may be differently sized based upon the dimensions of the associated device 550. By way of example, device 550 may be a portable electronic device having diametric or length dimension smaller that the diameter of length of transmit antenna 414. In such an example, receive antenna 518 may be implemented as a multi-turn antenna in order to reduce the capacitance value of a tuning capacitor (not shown) and increase the receive antenna's impedance. By way of example, receive antenna 518 may be placed around the substantial circumference of device 550 in order to maximize the antenna diameter and reduce the number of loop turns (i.e., windings) of the receive antenna 518 and the inter-winding capacitance.

Receive circuitry 510 may provide an impedance match to the receive antenna 518. Receive circuitry 510 includes power conversion circuitry 506 for converting a received RF energy source into charging power for use by the device 550. Power conversion circuitry 506 includes an RF-to-DC converter 520 and may also in include a DC-to-DC converter 522. RF-to-DC converter 520 rectifies the RF energy signal received at receive antenna 518 into a non-alternating power with an output voltage represented by $V_{rect}$. The DC-to-DC converter 522 (or other power regulator) converts the rectified RF energy signal into an energy potential (e.g., voltage) that is compatible with device 550 with an output voltage and output current represented by $V_{out}$ and $I_{out}$. Various RF-to-DC converters are contemplated, including partial and full rectifiers, regulators, bridges, doublers, as well as linear and switching converters.

Receive circuitry 510 may further include switching circuitry 512 for connecting receive antenna 518 to the power conversion circuitry 506 or alternatively for disconnecting the power conversion circuitry 506. Disconnecting receive antenna 518 from power conversion circuitry 506 not only suspends charging of device 550, but also changes the "load" as "seen" by the transmitter 404 (FIG. 2).

As disclosed above, transmitter 404 includes load sensing circuit 416 that may detect fluctuations in the bias current provided to transmitter driver circuit 424. Accordingly, transmitter 404 has a mechanism for determining when receivers are present in the transmitter's near-field.

When multiple receivers 508 are present in a transmitter's near-field, it may be desirable to time-multiplex the loading and unloading of one or more receivers to enable other receivers to more efficiently couple to the transmitter. A receiver 508 may also be cloaked in order to eliminate coupling to other nearby receivers or to reduce loading on nearby transmitters. This "unloading" of a receiver is also known herein as a "cloaking." Furthermore, this switching between unloading and loading controlled by receiver 508 and detected by transmitter 404 may provide a communication mechanism from receiver 508 to transmitter 404 as is explained more fully below. Additionally, a protocol may be associated with the switching that enables the sending of a message from receiver 508 to transmitter 404. By way of example, a switching speed may be on the order of 100 μsec.

In an exemplary embodiment, communication between the transmitter 404 and the receiver 508 refers to a device sensing and charging control mechanism, rather than conventional two-way communication (i.e., in band signaling using the coupling field). In other words, the transmitter 404 may use on/off keying of the transmitted signal to adjust whether energy is available in the near-field. The receiver may interpret these changes in energy as a message from the transmitter 404. From the receiver side, the receiver 508 may use tuning and de-tuning of the receive antenna 518 to adjust how much power is being accepted from the field. In some cases, the tuning and de-tuning may be accomplished via the switching circuitry 512. The transmitter 404 may detect this difference in power used from the field and interpret these changes as a message from the receiver 508. It is noted that other forms of modulation of the transmit power and the load behavior may be utilized.

Receive circuitry 510 may further include signaling detector and beacon circuitry 514 used to identify received energy fluctuations, that may correspond to informational signaling from the transmitter to the receiver. Furthermore, signaling and beacon circuitry 514 may also be used to detect the transmission of a reduced RF signal energy (i.e., a beacon signal) and to rectify the reduced RF signal energy into a nominal power for awakening either un-powered or power-depleted circuits within receive circuitry 510 in order to configure receive circuitry 510 for wireless charging.

Receive circuitry 510 further includes processor 516 for coordinating the processes of receiver 508 described herein including the control of switching circuitry 512 described herein. Cloaking of receiver 508 may also occur upon the occurrence of other events including detection of an external wired charging source (e.g., wall/USB power) providing charging power to device 550. Processor 516, in addition to controlling the cloaking of the receiver, may also monitor beacon circuitry 514 to determine a beacon state and extract messages sent from the transmitter 404. Processor 516 may also adjust the DC-to-DC converter 522 for improved performance.

Figure 6:
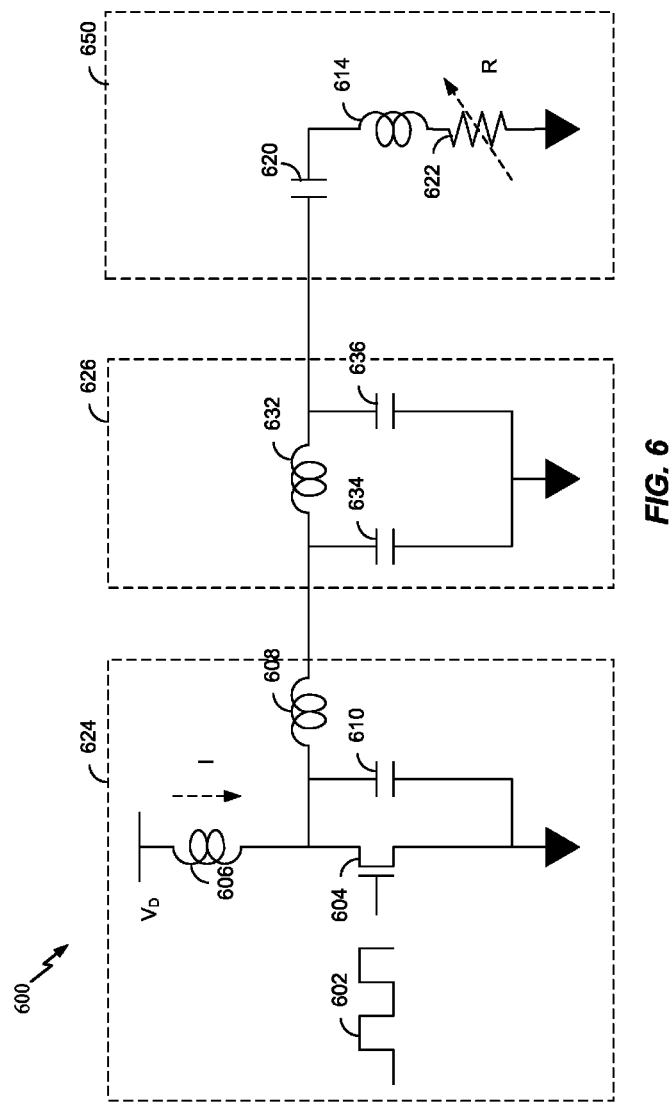
FIG. 6 is a schematic diagram of a portion of transmit circuitry that may be used in the transmit circuitry of FIG. 4.

FIG. 6 is a schematic diagram of a portion of transmit circuitry 600 that may be used in the transmit circuitry 406 of FIG. 4. The transmit circuitry 600 may include a driver circuit 624 as described above in FIG. 4. As described above, the driver circuit 624 may be a switching amplifier that may be configured to receive a square wave and output a sine wave to be provided to the transmit circuit 650. In some cases the driver circuit 624 may be referred to as an amplifier circuit. The driver circuit 624 is shown as a class E amplifier, however, any suitable driver circuit 624 may be used in accordance with embodiments. The driver circuit 624 may be driven by an input signal 602 from an oscillator 423 as shown in FIG. 4. The driver circuit 624 may also be provided with a drive voltage $V_D$ that is configured to control the maximum power that may be delivered through a transmit circuit 650. To eliminate or reduce harmonics, the transmit circuitry 600 may include a filter circuit 626. The filter circuit 626 may be a three pole (capacitor 634, inductor 632, and capacitor 636) low pass filter circuit 626.

The signal output by the filter circuit 626 may be provided to a transmit circuit 650 comprising an antenna 614. The transmit circuit 650 may include a series resonant circuit having a capacitance 620 and inductance (e.g., that may be due to the inductance or capacitance of the antenna or to an additional capacitor component) that may resonate at a frequency of the filtered signal provided by the driver circuit 624. The load of the transmit circuit 650 may be represented by the variable resistor 622. The load may be a function of a wireless power receiver 508 that is positioned to receive power from the transmit circuit 650.

In some embodiments, the antenna 614 can include an active antenna and a passive antenna. In an embodiment, the active antenna can be referred to as a "main" antenna, and the passive antenna can be referred to as a "parasitic" antenna. Together, the active and passive antennas can create a substantially uniform field distribution at or around a fundamental frequency. In an embodiment, the substantially uniform field distribution can include a field strength that does not deviate beyond 60% across an operating area such as, for example a charging surface. In another embodiment, the substantially uniform field distribution can include a field strength that does not deviate beyond 50% across the operating area. In yet another embodiment, the substantially uniform field distribution can include a field strength that does not deviate beyond 25% across an operating area. In an embodiment, the active and passive antennas can create a substantially non-uniform field distribution at frequencies other than the fundamental frequency. In various embodiments, the substantially non-uniform field distribution can include field strengths that do deviate beyond the substantially uniform field distribution discussed above.

Figure 7:
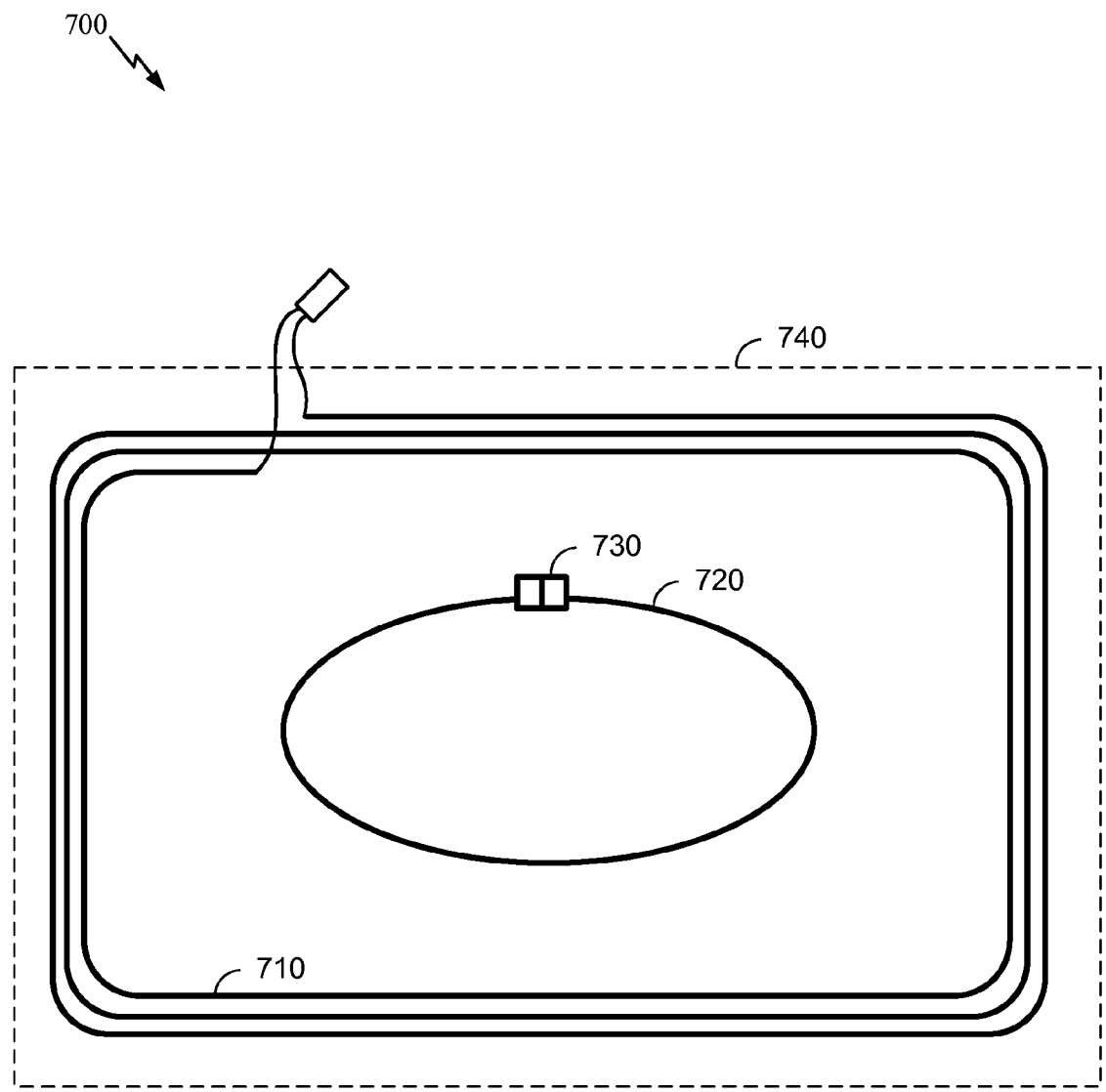
FIG. 7 is an exemplary transmit antenna, including an active antenna and a passive antenna, that may be used in the transmit circuitry of FIG. 6.

FIG. 7 is an exemplary transmit antenna 700, including an active antenna 710 and a passive antenna 720 that may be used in the transmit circuitry of FIG. 6. In an embodiment, the transmit antenna 700 can be defined in or around a charging surface 740. In an embodiment, the transmit antenna 700 can be the antenna 614 (FIG. 6). In other embodiment, the transmit antenna 700 can be the transmit antenna 214 (FIG. 2) and/or the transmit antenna 414 (FIG. 4). In an embodiment, the passive antenna 720 can include a reactive network of passive components 730. In an embodiment, the reactive network of passive components 730 may include a single capacitor. In another embodiment, the reactive network can include active components. For example, the reactive network can include a combination of variable components such as capacitors, resistors, etc.

Because the active and passive antennas may create a substantially non-uniform field distribution at frequencies other than the fundamental frequency, a wireless power transmitter may not detect one or more devices tuned to another frequency. For example, an Near-Field Communication (NFC) card, which may be tuned to a frequency about twice that of the antenna's fundamental frequency, may go undetected when placed inside the passive antenna due to a null field inside the parasitic loop at the NFC frequency. As described herein, various systems and methods may be employed to create a detectable condition when devices operating at one or more frequencies other than the fundamental frequency are placed near the transmit antenna.

In various embodiments, one or more elements of the reactive network 730 can be tuned to provide a desired field distribution at several frequencies. For example, in various embodiments shown below in Table 1, the reactive network 730 can tune the passive antenna 720 to provide a desired field distribution at around 6.78 MHz (e.g., for charging), around 13.56 MHz (e.g., for NFC detection), and/or any other frequency (e.g., for communication).

TABLE 1

| Frequency (MHz) | jXpar | Description |
|---|---|---|
| 6.78 | $-jX_0$ | Uniform field distribution at 6.78 MHz |
| 13.56 | $\infty$ | Making the parasitic loop "disappear" at 13.56 MHz |
|  | 0 | Making the parasitic loop resonant at 13.56 MHz |
|  | $-jX_1$ | Uniform field distribution at 13.56 MHz |
| 40.68 | $-jX_2$ | Uniform field distribution at 40.68 MHz |

Table 1, shown above, shows reactance jXpar at the passive antenna 720 under various tunings of the reactive networks 800A-D. In one embodiment, the reactive network 730 can tune the passive antenna 720 to a first reactance $-jX_0$ at or around 6.78 MHz, creating a uniform field distribution. In another embodiment, the reactive network 730 can tune the passive antenna 720 to infinite reactance at or around 13.56 MHz, causing the passive antenna to "disappear." In other words, at 13.56 MHz, the antenna 700 can electrically appear to have only the active antenna 710, and no passive antenna 720 (i.e., a hole in the center of the antenna 700). This arrangement can be used, for example, for NFC detection.

In another embodiment, the reactive network 730 can tune the passive antenna 720 to zero reactance at or around 13.56 MHz, making the passive antenna 720 resonant. In other words, at 13.56 MHz, the field strength can be boosted in the center of the antenna 700. In another embodiment, the reactive network 730 can tune the passive antenna 720 to a second reactance $-jX_1$ at or around 13.56 MHz, creating a uniform field distribution. This arrangement can be used, for example, for NFC detection.

In another embodiment, the reactive network 730 can tune the passive antenna 720 to a second reactance $-jX_2$ at or around 40.68 MHz, creating a uniform field distribution. This arrangement can be used, for example, to enable communication at or around the 40 MHz band. Accordingly, in an embodiment, the antenna 700 can be tuned to support both power transfer and communication.

Figure 8A:
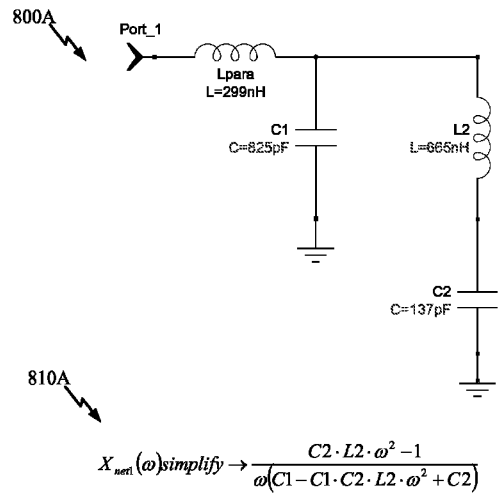
FIGS. 8A-D are schematic diagrams of reactive networks that may be used in the passive antenna of FIG. 7, in accordance with exemplary embodiments.

FIGS. 8A-D are schematic diagrams of reactive networks 800A-D that may be used in the passive antenna 720 of FIG. 7, in accordance with exemplary embodiments. In various embodiments, the reactive networks 800A-D can be the reactive network 730 described above with respect to FIG. 7. Referring to FIG. 8A, the reactive network 800A can include an input Port_1, a first parasitic inductor Lpara, a second inductor L2, a first capacitor C1, and a second capacitor C2. In an embodiment, the first parasitic inductor Lpara can be fixed. The second inductor L2, the first capacitor C1, and the second capacitor C2 can be chosen to accomplish design goals, for example as discussed above with respect to Table 1.

Referring still to FIG. 8A, in the illustrated embodiment, the first parasitic inductor Lpara can be about 299 nH. The second inductor L2, the first capacitor C1, and the second capacitor C2 can be chosen to accomplish design goals, for example as discussed above with respect to Table 1. In the illustrated embodiment, the second inductor L2 is about 665 nH, the first capacitor is about 825 pF, and the second capacitor is about 137 pF. The second inductor L2 can be configured in series with the second capacitor C2, both of which can be configured in parallel with the first capacitor C1. The first parasitic inductor Lpara can be configured in series with the network including the second inductor L2, first capacitor C1, and the second capacitor C2. The general equation for the network 800A shown in FIG. 8A can be given as equation 810A.

Figure 8B:
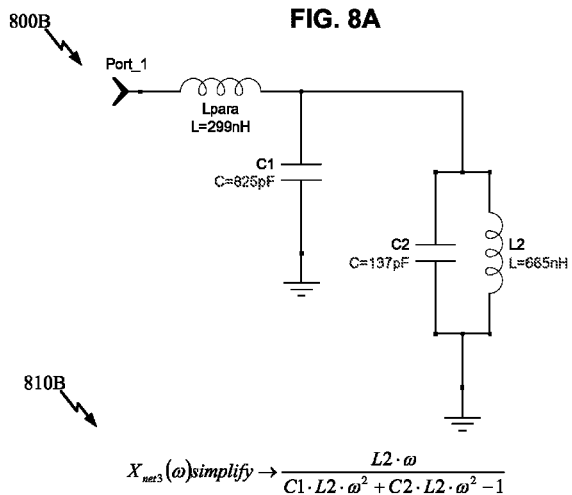

Referring now to FIG. 8B, the reactive network 800B can include the input Port_1, the first parasitic inductor Lpara, the second inductor L2, the first capacitor C1, and the second capacitor C2. In the illustrated embodiment, the first parasitic inductor Lpara can be about 299 nH. The second inductor L2 is about 665 nH, the first capacitor is about 825 pF, and the second capacitor is about 137 pF. The second inductor L2 can be configured in parallel with the first capacitor C1 and the second capacitor C2, all of which can be configured in series with the first parasitic inductor Lpara. The general equation for the network 800B shown in FIG. 8B can be given as equation 810B.

Figure 8C:
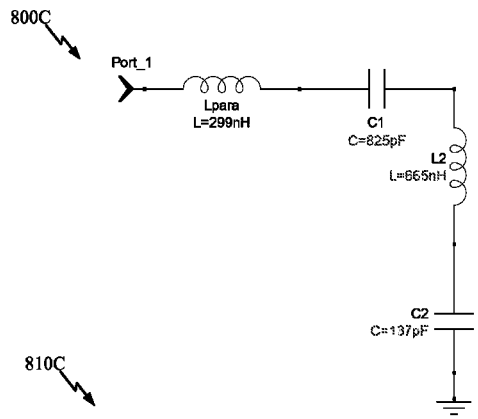

Referring now to FIG. 8C, the reactive network 800C can include the input Port_1, the first parasitic inductor Lpara, the second inductor L2, the first capacitor C1, and the second capacitor C2. In the illustrated embodiment, the first parasitic inductor Lpara can be about 299 nH. The second inductor L2 is about 665 nH, the first capacitor is about 825 pF, and the second capacitor is about 137 pF. The first parasitic inductor Lpara can be configured in series with the first capacitor C1, the second inductor L2, and the second capacitor C2, respectively. The general equation for the network 800C shown in FIG. 8C can be given as equation 810C.

Figure 8D:
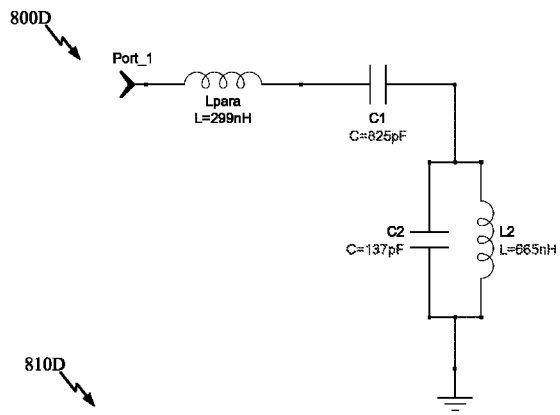

Referring now to FIG. 8D, the reactive network 800D can include the input Port_1, the first parasitic inductor Lpara, the second inductor L2, the first capacitor C1, and the second capacitor C2. In the illustrated embodiment, the first parasitic inductor Lpara can be about 299 nH. The second inductor L2 is about 665 nH, the first capacitor is about 825 pF, and the second capacitor is about 137 pF. The second inductor L2 can be configured in parallel with the second capacitor C2. The first parasitic inductor Lpara can be configured in series with the first capacitor C1 and the parallel network including the second capacitor C2 and the second inductor L2, respectively. The general equation for the network 800D shown in FIG. 8D can be given as equation 810D.

Although FIGS. 8A-D show exemplary reactive networks 800A-D including combinations of three configurable reactive components, a person having ordinary skill in the art will appreciate that greater or fewer reactive components can be included, and the reactive components can be combined in different configurations. Moreover, while specific values are shown in FIGS. 8A-D, a person having ordinary skill in the art will appreciate that the given values are exemplary, and that other values may be used.

Figure 9A:
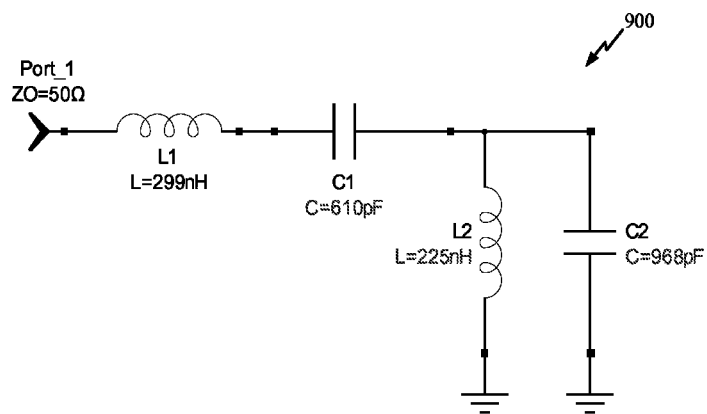
FIG. 9A is a schematic diagram of a reactive network that may be used in the passive antenna of FIG. 7, in accordance with another exemplary embodiment.

FIG. 9A is a schematic diagram of a reactive network 900 that may be used in the passive antenna of FIG. 7, in accordance with another exemplary embodiment. The reactive network 900 has the same topology as the reactive network 800D, described above with respect to FIG. 8D. Specifically, the reactive network 800 includes an input Port_1, a first inductor L1, a second inductor L2, a first capacitor C1, and a second capacitor C2. In the illustrated embodiment, the input Port_1 can have an impedance of around 50Ω. The first inductor L1 is about 299 nH, the second inductor L2 is about 255 nH, the first capacitor is about 610 pF, and the second capacitor is about 968 pF. The second inductor L2 is configured in parallel with the second capacitor C2, both of which are configured in series with the first capacitor C1.

Figure 9B:
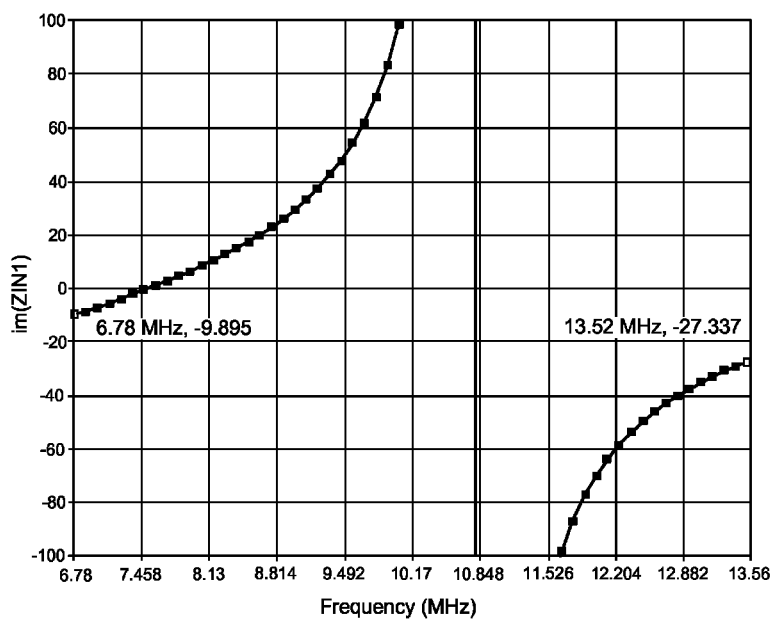
FIG. 9B is a graph of impedance with respect to frequency for the reactive network of FIG. 9A.

FIG. 9B is a graph of impedance with respect to frequency for the reactive network of FIG. 9A. The x-axis shows frequency in MHz, and the y-axis shows impedance in $j\Omega$. As shown, the reactive network 900 provides a substantially uniform field distribution at 6.78 MHz, with a parasitic reactance of around $-j9.8955\Omega$. This configuration can be used, for example, for wireless power charging. The reactive network 900 also provides a substantially uniform field distribution at 13.52 MHz, with a parasitic reactance of around $-j27.3375\Omega$. This configuration can be used, for example, for NFC detection.

Figure 10A:
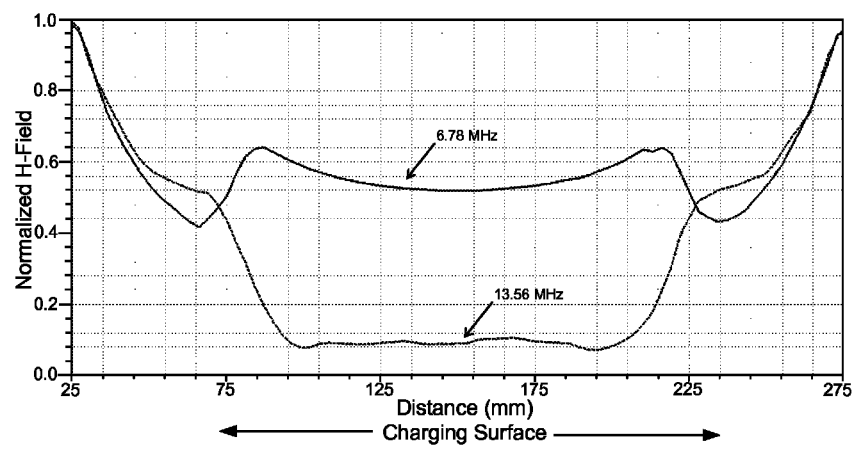
FIG. 10A is a graph of a normalized H-field distribution across the length of a charging surface in accordance with an exemplary embodiment.

FIG. 10A is a graph of a normalized H-field distribution across the length of a charging surface in accordance with an exemplary embodiment of the invention. The x-axis is a distance, in mm, along a first axis a charging antenna. The charging antenna can be, for example, the antenna 720 described above with respect to FIG. 7. The y-axis is a normalized H-field, in A/m. As discussed above with respect to FIG. 7, the reactive network 720 can be configured to create various detectable conditions in the passive antenna 720 at or near different operating frequencies. FIG. 10A shows a configuration wherein the H-field is substantially uniformly distributed along the x-axis around 6.78 MHz, and creates a "hole" in the center of the antenna 700 around 13.56 MHz. For example, the reactive network 720 can be configured to present an infinite reactance around 13.56 MHz, causing the passive antenna 720 to become electromagnetically invisible at that frequency. In some embodiments, this "hole" may be unintentional. In other words, it may not be caused by an explicit infinite reactance on the passive antenna 720. Instead, it may be the result of operating the passive antenna 720 at another, single, frequency (such as, for example, 6.78 MHz). In an embodiment, the hole can be removed by configuring the passive antenna 720 to operate at additional frequencies (for example, as shown in FIG. 10B).

Figure 10B:
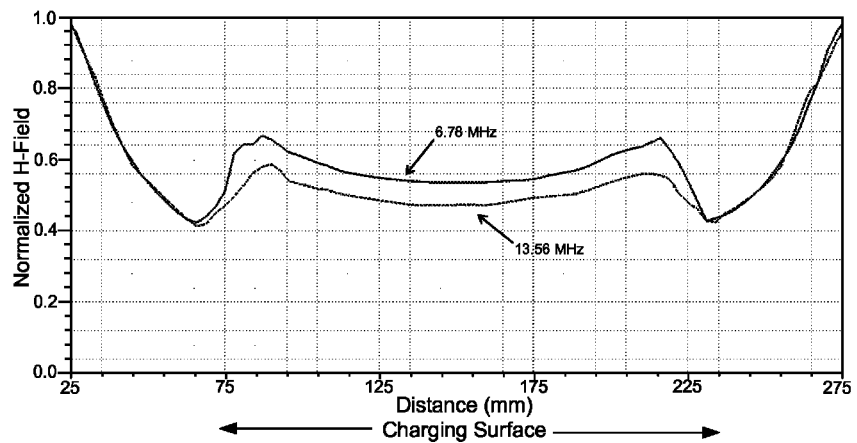
FIG. 10B is a graph of a normalized H-field distribution across the length of a charging surface in accordance with another exemplary embodiment.

FIG. 10B is a graph of a normalized H-field distribution across the length of a charging surface in accordance with another exemplary embodiment. The x-axis is a distance, in mm, along a first axis a charging antenna. The charging antenna can be, for example, the antenna 720 described above with respect to FIG. 7. The y-axis is a normalized H-field, in A/m. FIG. 10B shows a configuration wherein the H-field is substantially uniformly distributed along the x-axis around both 6.78 MHz and 13.56 MHz. In an embodiment, the H-field can be substantially uniformly distributed because the passive antenna 720 is configured to operate at a plurality of frequencies (in this case, at least 6.78 MHz and 13.56 MHz), as described above. By operating the passive antenna 720 at a plurality of frequencies, the "hole" described above with respect to FIG. 10A can be removed (in embodiments where the hole is unintentional).

Figure 11:
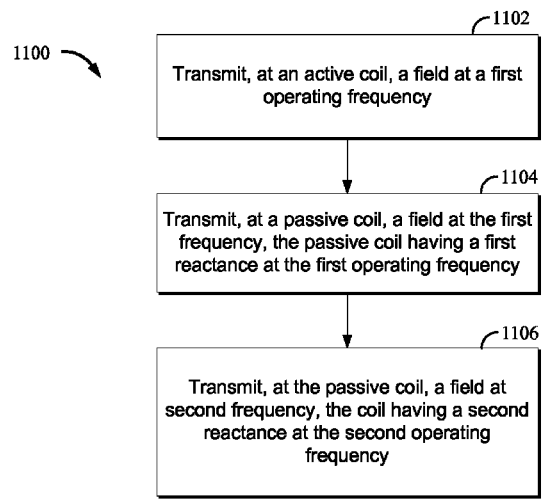
FIG. 11 is a flowchart of an exemplary method of charging a wireless device.

FIG. 11 is a flowchart 1100 of an exemplary method of charging a wireless device. Although the method of flowchart 1100 is described herein with reference to the antenna 700 discussed above with respect to FIG. 7, a person having ordinary skill in the art will appreciate that the method of flowchart 1100 may be implemented by the transmitter 104 discussed above with respect to FIG. 1, the transmitter 204 discussed above with respect to FIG. 2, and/or any other suitable device. In an embodiment, the steps in flowchart 1100 may be performed by a processor or controller such as, for example, the controller 415 (FIG. 4) and/or the processor-signaling controller 516 (FIG. 5). Although the method of flowchart 1100 is described herein with reference to a particular order, in various embodiments, blocks herein may be performed in a different order, or omitted, and additional blocks may be added.

First, at block 1102, the active antenna 710 transmits a field at a first operating frequency. In various embodiments, the first operating frequency can be around 6.78 MHz, around 13.56 MHz, and/or around 40.68 MHz. In various embodiments, the first operating frequency can be suitable for communication, such as NFC, and/or suitable for wireless power transfer or charging. As discussed above, the active antenna 710 can transmit the field in a substantially uniform distribution.

Next, at block 1104, the passive antenna 720 transmits a field at the first operating frequency. The passive antenna 720 can have a first reactance at the first operating frequency. In various embodiments, the passive antenna 720 can have zero or infinite reactance at the first operating frequency. In an embodiment, the passive antenna 720 can transmit the field in a substantially uniform distribution at the first operating frequency.

Then, at block 1106, the passive antenna 720 transmits a field at a second operating frequency. In various embodiments, the second operating frequency can be around 6.78 MHz, around 13.56 MHz, and/or around 40.68 MHz. In various embodiments, the second operating frequency can be suitable for communication, such as NFC, and/or suitable for wireless power transfer or charging. The passive antenna 720 can have a second reactance at the second operating frequency. In various embodiments, the passive antenna 720 can have zero or infinite reactance at the second operating frequency. In an embodiment, the passive antenna 720 can transmit the field in a substantially uniform distribution at the second operating frequency.

Figure 12:
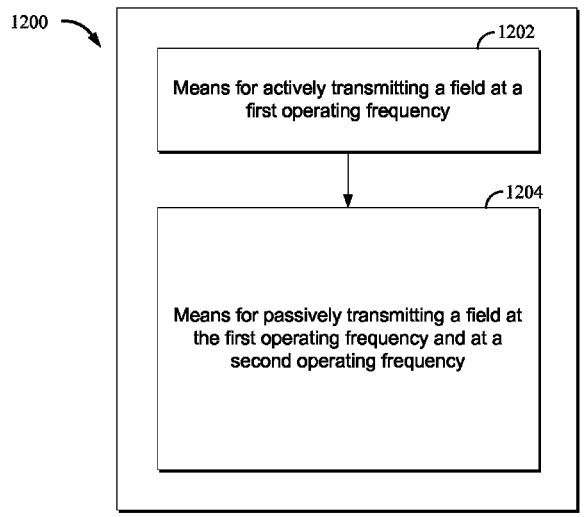
FIG. 12 is a functional block diagram of a wireless power transmit antenna, in accordance with an exemplary embodiment.

FIG. 12 is a functional block diagram of a wireless power transmit antenna 1200, in accordance with an exemplary embodiment. Wireless power transmit antenna 1200 comprises means 1202 for actively transmitting a field at a first operating frequency, and means 1204 for passively transmitting a field at the first operating frequency and at a second operating frequency. In an embodiment, the means 1202 for actively transmitting can be configured to perform one or more of the function described above with respect to block 1102 (FIG. 11). The means 1202 can include the active antenna 710 (FIG. 7).

The means 1204 for passively transmitting can be configured to perform one or more of the function described above with respect to blocks 1104 and/or 1106. The means 1204 can include the passive antenna 720 (FIG. 7). In various embodiments, the means 1202 and 1204 can be implemented by a processor or controller such as, for example, the controller 415 (FIG. 4) and/or the processor-signaling controller 516 (FIG. 5).

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features have been described herein. It is to be understood that not necessarily all such advantages may be achieved in accordance with any particular embodiment. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus for wireless charging comprising a transmitting antenna comprising:
    an active antenna circuit configured to generate a first wireless field; and
    a passive antenna circuit including a parasitic element and at least one capacitor and at least one inductor that are connected to the parasitic element, the passive antenna circuit configured to generate a second wireless field, the passive antenna circuit having a first reactance at a first operating frequency and a second reactance at a second operating frequency, the at least one capacitor and the at least one inductor configured to tune the passive antenna circuit to generate the second wireless field at the first and second operating frequencies, a combination of the first wireless field and the second wireless field creates a combined wireless field having a field strength that does not deviate beyond 60% across a first axis of the active antenna in a charging area.

2. The apparatus of claim 1, wherein said passive antenna circuit comprises a network of a plurality of reactive elements.

3. The apparatus of claim 1, wherein the first operating frequency is one of at least two frequencies of a plurality of operating frequencies and the second operating frequency is not one of the at least two frequencies of the plurality of operating frequencies.

4. The apparatus of claim 1, wherein the at least one capacitor is chosen with a fixed, non-switchable capacitance and the at least one inductor is chosen with a fixed, non-switchable inductance, and wherein the first frequency determines the first reactance and the second frequency determines the second reactance.

5. The apparatus of claim 1, wherein the second reactance comprises an effectively infinite reactance.

6. The apparatus of claim 1, wherein the second reactance comprises an effectively zero reactance.

7. The apparatus of claim 1, wherein the first operating frequency is about 6.78 MHz.

8. The apparatus of claim 1, wherein the second operating frequency is around 13.56 MHz.

9. The apparatus of claim 1, wherein the second operating frequency is around 40.68 MHz.

10. A method of charging a wireless device, the method comprising:
    generating, at an active antenna circuit, a first wireless field at a first operating frequency;
    generating, at a passive antenna circuit including a parasitic element and at least one capacitor and at least one inductor that are connected to the parasitic element, a second wireless field at the first operating frequency; and
    generating, at the passive antenna circuit, the second wireless field at a second operating frequency, the passive antenna circuit having a first reactance at the first operating frequency and a second reactance at the second operating frequency, the at least one capacitor and the at least one inductor configured to tune the passive antenna circuit to generate the second wireless field at the first and second operating frequencies, a combination of the first wireless field and the second wireless field creates a combined wireless field having a field strength that does not deviate beyond 60% across a first axis of the active antenna circuit in a charging area.

11. The method of claim 10, wherein said passive antenna circuit comprises a network of a plurality of reactive elements.

12. The method of claim 10, wherein the second reactance comprises an effectively infinite reactance.

13. The method of claim 10, wherein the second reactance comprises an effectively zero reactance.

14. The method of claim 10, wherein the first operating frequency is about 6.78 MHz.

15. The method of claim 10, wherein the second operating frequency is around 13.56 MHz.

16. The method of claim 10, wherein the second operating frequency is around 40.68 MHz.

17. An apparatus for charging a wireless device, the apparatus comprising:
   means for actively generating a first wireless field at a first operating frequency; and
   means for passively generating a second wireless field at the first operating frequency and at a second operating frequency, the means for passively generating comprising means for providing a first reactance at the first operating frequency and a second reactance at the second operating frequency; and
   means for tuning the means for passively generating the second wireless field at the first and second operating frequencies, a combination of the first wireless field and the second wireless field creates a combined wireless field having a field strength that does not deviate beyond 60% across a first axis of the means for actively generating in a charging area.

18. The apparatus of claim 17, wherein said means for passively generating comprises means for providing reactance.

19. A non-transitory computer-readable medium comprising code that, when executed, causes an apparatus to:
   generate, at an active antenna circuit, a first wireless field at a first operating frequency;
   generate, at a passive antenna circuit including a parasitic element and at least one capacitor and at least one inductor that are connected to the parasitic element, a second wireless field at the first operating frequency; and
   generate, at the passive antenna circuit, the second wireless field at a second operating frequency,
   the passive antenna circuit having a first reactance at the first operating frequency and a second reactance at the second operating frequency, the at least one capacitor and the at least one inductor configured to tune the passive antenna circuit to generate the second wireless field at the first and second operating frequencies, a combination of the first wireless field and the second wireless field creates a combined wireless field having a field strength that does not deviate beyond 60% across a first axis of the active antenna circuit in a charging area.

* * * * *